May 30, 1944.  R. D. SMITH  2,350,077
BALANCE TESTING MECHANISM
Filed May 5, 1942  2 Sheets-Sheet 1

Inventor
R. D. Smith
By Merrill M. Blackburn
Attorney

May 30, 1944.　　　R. D. SMITH　　　2,350,077
BALANCE TESTING MECHANISM
Filed May 5, 1942　　2 Sheets-Sheet 2

Inventor
R. D. Smith
By Merrill M. Blackburn.
Attorney

Patented May 30, 1944

2,350,077

UNITED STATES PATENT OFFICE 2,350,077

BALANCE TESTING MECHANISM

Roy D. Smith, Bettendorf, Iowa, assignor to Bee-Line Company, Scott County, Iowa, a copartnership Application May 5, 1942, Serial No. 441,883

11 Claims. (Cl. 73—53)

In the art of testing the balance of airplane propellers and other bodies rotating at a high speed, there have heretofore been no means provided for making an accurate test of the balance or unbalance of the article which it is desired to have accurately balanced. As a result, there have been inaccuracies in the balance of such structures which have resulted in lateral vibration thereof and of the shaft supporting the same for rotation. This results in excessive wear of the shaft bearings and eventually necessitates extensive repairs to the machine with which such rotating body is connected. The principal object, therefore, of the present invention is to provide an apparatus by means of which minute deviations from a perfect balance may be discovered in the structure being tested. Other objects are to provide an accurate apparatus for the purpose indicated which is inexpensive to produce; to provide a structure of the character indicated which will produce accurate results and yet will not be so sensitive as to be practically impossible to manufacture; to provide a structure for the purpose indicated in which the location of the center of mass of a supported system can be readily adjusted vertically whereby to regulate the sensitivity of the testing apparatus; and such further objects, advantages, and capabilities as will hereafter appear and as are inherent in the structure disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Figures 1, 2:
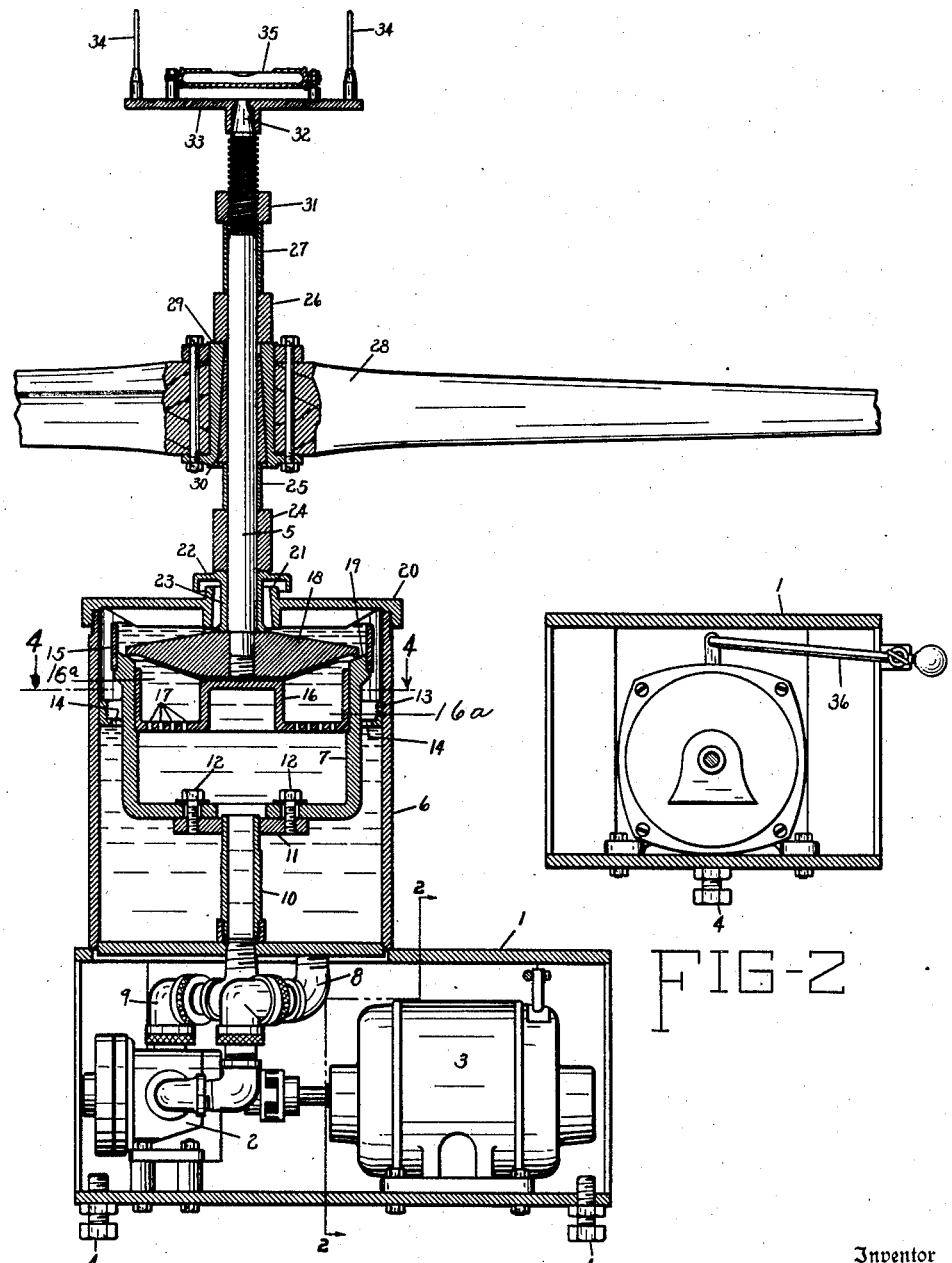
Fig. 1 represents, essentially, a vertical central section of this apparatus with a propeller mounted thereon, parts of the propeller being broken away.
Fig. 2 represents a vertical transverse section approximately along the broken plane indicated by the line 2—2, Fig. 1.

Reference will now be made in greater detail to the annexed drawings for a more complete description of this invention. A support, in the form of a housing 1, contains a pump 2 and a variable speed electric motor 3 for driving the pump. This support rests upon adjustable legs 4. A pair of receptacles or reservoirs 6 and 7 are supported on the housing 1, the outer receptacle having an outlet 8 leading from the bottom part thereof and entering the inlet side of the pump 2. From this pump leads an outlet pipe 9 which constitutes a part of the inlet system of the inner receptacle 7. A pipe 10 is connected in fluid-tight relation to the pipe 9 and also to a plate 11 secured to the bottom of the receptacle 7. These two may be held together in fluid-tight relation by bolts 12, as shown in Fig. 1.

A ring 13 fits closely the inside of the outer receptacle or reservoir 6 and has a plurality of openings 14 therethrough to permit liquid forced through and out of the receptacle or reservoir 7 to drain back into the receptacle 6. This member 13, in conjunction with the pipe 10, holds the inner receptacle 7 against any movement within the outer receptacle. An extension 15 is secured to the upper outer portion of the receptacle 7 and the intention is that its upper edge be level when the mechanism is properly leveled up. When the liquid, preferably oil, with which the reservoirs are provided, is forced by the pump 2 to overflow the top of the extension 15, this liquid flows downwardly through the openings 14 into the chamber in the bottom of the receptacle 6. A partition member 16 extends across the upper part of the receptacle 7 and fits closely therein, being provided with openings 17 through which the liquid forced into the lower part of the receptacle 7, through the tube 10, may pass into the upper part of the receptacle 7. These openings 17, being formed vertically through the partition 16, prevent any tendency to a swirling action of the liquid entering the upper portion of this receptacle. Vanes 16a assist in preventing swirling action in the liquid passing through the openings 17.

At the upper edge of the upright wall of the receptacle 7 is formed a surface 19 which is a segment of a spherical surface of which the radius is preferably about thirteen and one-half inches (13½″), and the center is located in the axial line of the shaft 5. As a matter of fact, when the parts 5 and 18 tilt because of a statically unbalanced weight placed upon the shaft 5, this tilting is about the center of the sphere of which the surface 19 constitutes a part. The outer edge portion of the valve-like member 18, which contacts the surface 19, is ground to a similar curvature as the latter surface and, therefore when the member 18 tilts, it maintains good contact with the surface 19 all the way around their region of contact.

The outer cylinder is provided with a cover 20 which has a substantially centrally arranged opening therethrough surrounded by a flange 21 which assists in preventing deleterious materials from entering either receptacle. A cover 22 has a downwardly extending flange which surrounds the flange 21 and assists in keeping out deleterious materials. This cover 22 has a downwardly extending sleeve 23 which rests upon the top of the valve-like member 18. The shaft 5 is secured in member 18 and passes upwardly through the sleeve 23, extending to a substantial distance above the cover 20. A plurality of sleeves 24, 25, 26, and 27, of various lengths and diameters, are provided in order to make it possible to adjust the height of the load 28 with reference to the center of oscillation, referred to above as the center of the sphere of which the surface 19 constitutes a part. By using sleeves of different lengths between the cover 22 and the load 28, shown in the present instance as a propeller, the height of the center of mass of the movable body may be varied. Also, by interchanging the weights (sleeves 24, 25, 26, 27), substituting a light for a heavy or a heavy for a light, the height of the center of mass may be varied. It is always desirable to keep the center of mass slightly below the sphere center referred to above in order to have stable equilibrium. If the center of mass and the sphere center were identical, there would be no tendency to maintain equilibrium. On the other hand, if the center of mass were to be above the sphere center, then there would be a clear case of unstable equilibrium. It is therefore important to keep the center of mass somewhat below the sphere center, but the nearer the two approach, the more sensitive is the tester. It is therefore possible to adjust the sensitiveness of the apparatus by proper selection and positioning of the sleeves 24, 25, 26, 27, as indicated above.

Since the hubs 29 of practically all propellers are provided with a tapered opening to fit a tapered shaft, sleeves 30 are provided, having an internal diameter such that they will just fit the shaft 5 and different external diameters which fit the different size openings in the various hubs. Fortunately, there are not a great number of hub diameters and it is therefore not necessary to provide a large number of tapered sleeves. A nut 31 is screwed on the upper end portion of the shaft 5 and pressed downwardly against the upper end of the sleeve 27, by which the pressure is transmitted to the hub 29 to hold the load in proper position and rigid with relation to the shaft. The upper end of the shaft, as shown at 32, is tapered to fit closely in a socket upon the under side of the bar 33 which carries a pair of sights 34 by means of which, when the device is used in testing the balance of a propeller, the bar may be lined up with a propeller blade to make it easy to determine the direction of off-balance. Mounted upon the crossbar 33 is a level 35 by means of which one can see whether a condition of balance or unbalance is indicated. Of course, if the propeller has two blades extending in opposite directions from a center, it is easy to determine the direction of off-balance. On the other hand, if there are three blades extending away from the axis, then it is necessary to turn the crossbar 33 to three different positions in which it lines up with the three blades. Testing in this way, it can be determined whether one or more blades are heavy or light and which ones are involved. In actual tests, the machine has been found so sensitive that, placing a drop of shellac on the outer end of a propeller blade would change the indication of the level 35. As a matter of fact, it has been found sensitive to one one-thousandth of an ounce on the tip of a propeller having a circle of rotation two hundred inches (200") in diameter.

Since it is necessary that the valve-like member 18 be capable of sliding easily on the surface 19, it is necessary that it and the load supported thereon shall be lifted sufficiently to permit a thin film of oil to pass between member 18 and the surface 19. If the pump 2 is not operating, then member 18 settles down upon the surface 19 and does not slide easily thereon. However, when the motor 3 is started and the pump 2 draws oil from the reservoir 6 and forces it through the pipes 9 and 10 into the reservoir 7, it lifts up on the member 18 and raises this sufficiently to permit a thin film of oil to pass outwardly thereunder. This makes it possible for the load, comprising the member 18 and all parts supported thereby, to seek a position of equilibrium by tilting about the sphere center, if the load is not in a condition of equilibrium. However, if it is perfectly balanced, it will not tilt and the bubble of the level 35 will remain in central position. If a condition of unbalance is indicated by the level, then sufficient weight is added to the light part of the propeller to produce a condition of balance. Weight may be added to or removed from the propeller or balancing weights may be adjusted within the hub.

Since propellers vary considerably in weight, it is obvious that it will require various lifting forces to lift the valve-like member 18 from its seat. This variable lifting force can be provided by operating the motor 3 at different speeds. For this purpose, adjusting means 36 is provided for rotating the field of the motor and varying the speed thereof. When a sufficient speed is obtained, the pressure of the oil on the under face of the valve-like member 18 will lift this and its load sufficiently to permit easy tilting thereof in order to produce a condition of balance. Then, by turning the crossbar 33 about the shaft 5 until a maximum deflection of the level bubble is attained, the necessary point for adjustment of the load can be determined. After this adjustment has been made, a new test can be carried out to determine whether or not an exact balance has been attained.

Figure 3:
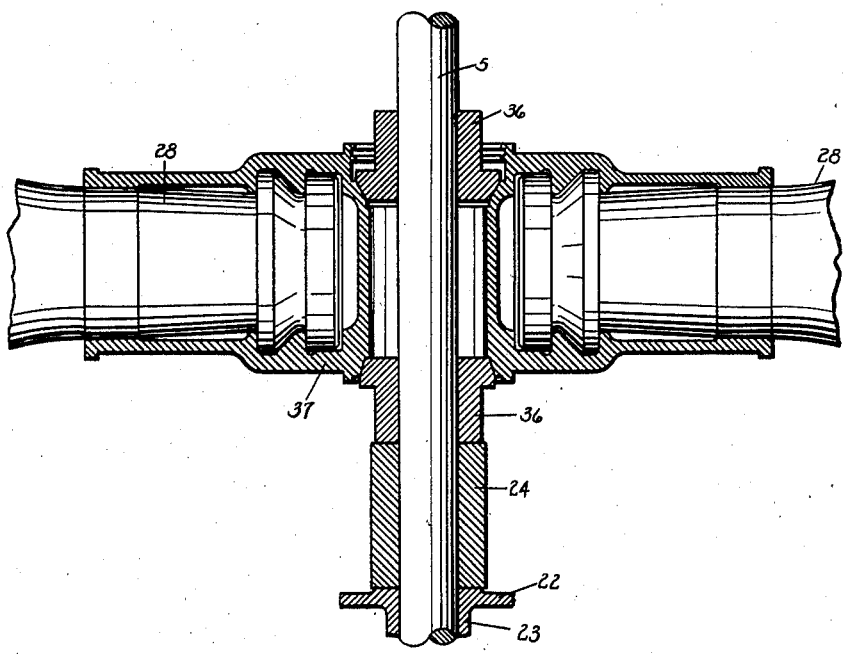
Fig. 3 represents a fragmentary longitudinal section of the hub part of a different type of propeller applied to this apparatus for balance testing.
Figure 4:
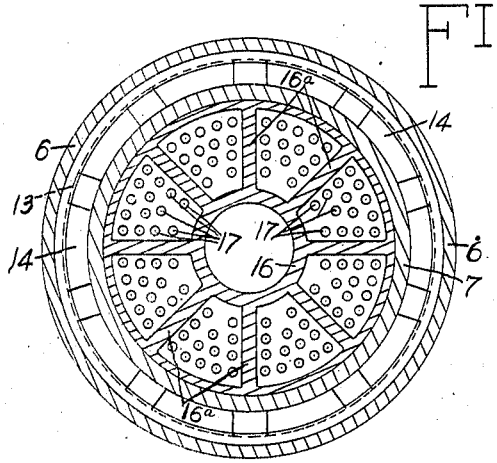
Fig. 4 represents a horizontal cross-section substantially along the plane indicated by the line 4—4, Fig. 1.

In Fig. 3 is shown another type of propeller hub in which only the ends of the shaft opening are tapered. This requires the use of a pair of centering members 36 which have their end portions tapered to fit the tapered openings in the hub 37.

It will be understood that the tester can be successfully used without the nut 31 and, as a matter of fact, it is more commonly used without it than with it. Various modifications of the structured disclosed have been tried, but these all come within the scope of this invention. It will of course be understood that the specific description of structure set forth herein may be departed from without departing from the spirit of my invention as expressed in the following claims:

Having now described my invention, I claim:

1. In a balance testing machine, a liquid receptacle having a second receptacle therein, a liquid inlet extending through the lower part of the first receptacle and into the interior of the second receptacle, the upper portion of the lateral wall of the second receptacle being formed as a valve seat, a closure member shaped to fit said seat closely, a vertically extending shaft carried thereby, the surface of the valve seat and cooperating surface of the closure member being formed as segments of spherical surfaces, whereby to permit universal tilting of the closure member and the shaft carried thereby with relation to the seat, the direction of tilt of the shaft indicating the direction of unbalance of the member being tested, means for securing on said shaft a member the balance of which is to be tested, an outlet from the first receptacle, liquid pumping means connected to said inlet and outlet to carry liquid under pressure from the first receptacle to the second receptacle and deliver it beneath said closure member, and means for indicating the amount of tilt and thereby the amount of unbalance.

2. A balance testing mechanism comprising, in combination, a liquid pumping mechanism, a reservoir for liquid connected operatively therewith, a second reservoir within the first reservoir and spaced laterally therefrom, the second reservoir being connected to the pumping mechanism by a tubular means to carry liquid from the pumping mechanism to the second reservoir, the second reservoir having an open top and being provided with an upwardly directed seat, a valve-like member shaped to fit said seat and resting thereon, a shaft rising from said valve-like member and passing outwardly from said reservoir, means for securing about said shaft an article to be balanced, said seat and valve member being shaped to allow universal tilting of one with relation to the other whereby to indicate the direction of unbalance of said article mounted on said shaft, and level testing means to indicate the amount of unbalance of the article being tested.

3. In a balance testing mechanism, the combination of a pair of liquid receptacles, one within the other and rigidly connected, said receptacles having their upper portions in open communication, liquid pumping means having its inlet connected to the outer receptacle and its outlet connected to the inner receptacle below the top thereof, a valve-like member having a shaft extending upwardly therefrom and out of the tops of the receptacles, the under face of the valve-like member and a face adjacent the upper end of the inner receptacle being fitted to each other comparably to the parts of a ball and socket joint to serve as a valve through which liquid may be forced, securing means connected to the shaft to secure thereto an article, the balance of which is to be tested, and a balance indicating means attachable to said shaft to indicate the deviation from a condition of balance of said article.

4. In a balance testing mechanism, the combination of a pair of liquid receptacles, one within the other and rigidly connected, said receptacles having their upper portions in open communication, liquid pumping means having its inlet connected to the outer receptacle and its outlet connected to the inner receptacle below the top thereof, a valve-like member having a shaft extending upwardly therefrom and out of the tops of the receptacles, the under face of the valve-like member and a face adjacent the upper end of the inner receptacle being fitted to each other to serve as a valve through which liquid may be forced, said faces being similarly curved in the direction of the axis of the valve seat, whereby to permit universal movement of the valve-like member with relation to the seat, and a level indicating means connected to said shaft to indicate its direction with relation to a vertical line, whereby to indicate any condition of unbalance of an article mounted upon said shaft and secured thereto.

5. In a balance testing mechanism, the combination of a pair of liquid receptacles, one within the other and rigidly connected, said receptacles having their upper portions in open communication, liquid pumping means having its inlet connected to the outer receptacle and its outlet connected to the inner receptacle below the top thereof, a valve-like member having a shaft extending upwardly therefrom and out of the tops of the receptacles, the under face of the valve-like member and a face adjacent the upper end of the inner receptacle being fitted to each other to serve as a valve through which liquid may be forced, means for securing to said shaft an article to be balanced, said faces being fitted to each other for universal tilting, whereby a condition of unbalance of said article may be determined, and means for determining the amount of such unbalance.

6. In a balance testing mechanism, a motor-driven liquid pump, a variable speed motor for driving said pump, a receptacle to which the inlet of said pump is connected, a second receptacle within the first receptacle, a liquid connection from the outlet of said pump to the interior of the second receptacle below the top thereof, the second receptacle having adjacent its top a valve seat surface, a valve member resting against the valve seat surface and fitting the same closely whether the valve member axis is coincident with or deviates slightly from the axis of the valve seat, a support rising centrally from the valve member and serving as a support for a member to have its balance tested, tilting of said support indicating unbalance of said member, and automatically functioning indicating means to indicate the amount of unbalance of said member.

7. A balance tester comprising a pair of receptacles, one contained within the other, means for drawing liquid from one receptacle and forcing it into the other, the receptacles being spaced from each other, laterally, to permit liquid flowing from the inner receptacle to flow downwardly between the receptacles into the outer receptacle, means within the inner receptacle to prevent a swirling motion of the liquid as it approaches the top of that receptacle, a valve member in the upper part of the inner receptacle, a supporting shaft extending upwardly from said valve member to support the member being tested, tilting of said shaft indicating a condition of unbalance of said member being tested, means on said shaft to secure the member being tested to said shaft, a valve seat on the wall of the inner receptacle with which the valve member cooperates in holding the liquid from flowing through the valve when the first mentioned means is not functioning, the pressure of the liquid in the inner receptacle, when the first mentioned means is functioning, serving to lift the valve member from its seat, whereby to permit the liquid to rise in the inner receptacle and overflow into the outer receptacle, the contacting faces of the valve member and seat being segments of a spherical surface whereby to permit easy tilting of the valve member, and an automatically functioning indicating means to indicate the amount of unbalance of said member being tested.

8. A structure as defined by claim 7 in which the upper edge of the inner receptacle rises above the valve member sufficiently to keep the valve member always immersed in liquid.

9. A structure as defined by claim 7 in which the contacting faces of the valve and seat forming segments of a spherical surface have a center of curvature on the axis of the shaft and a radius of approximately thirteen and one-half inches (13½").

10. A structure as defined by claim 7 having means for raising and lowering the center of mass of the supported body and its load.

11. In an apparatus for the purpose indicated, a pair of containers or reservoirs, one within the other, and both opening upwardly, conduit means connecting the bottom portions of said containers, rigidly, the inner container having adjacent its upper edge a surface which is a segment of a substantially spherical surface, a support having a correspondingly shaped surface cooperating with the first mentioned surface, an object-supporting standard rising approximately vertically from the center of said support, sand standard being designed to support an object substantially symmetrically with relation to the standard, a liquid in said containers, sufficient in amount to fill the inner container and approximately fill the outer container, and a diaphragm within the inner container, said diaphragm extending across the interior of the inner container and the major part thereof being perforated for the passage of liquid therethrough, in courses substantially parallel to the axis of the inner container, the liquid, when forced into the inner container, pressing substantially vertically against said support to raise it from contact with the inner container, and the spherical surfaces of contact allowing movement between the support and the inner container, substantially unrestrained by any contact between them.

ROY D. SMITH.